UNITED STATES PATENT OFFICE.

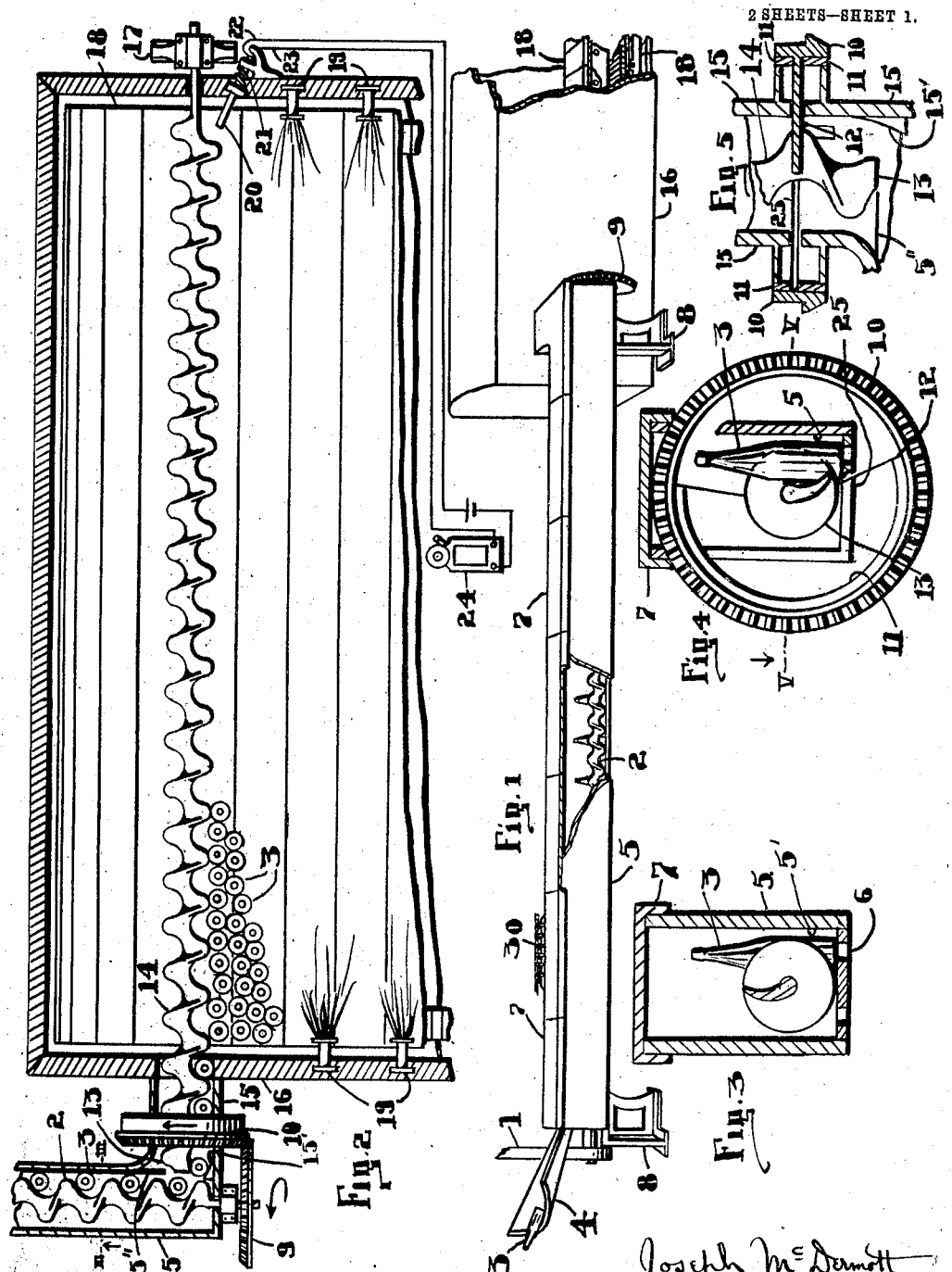

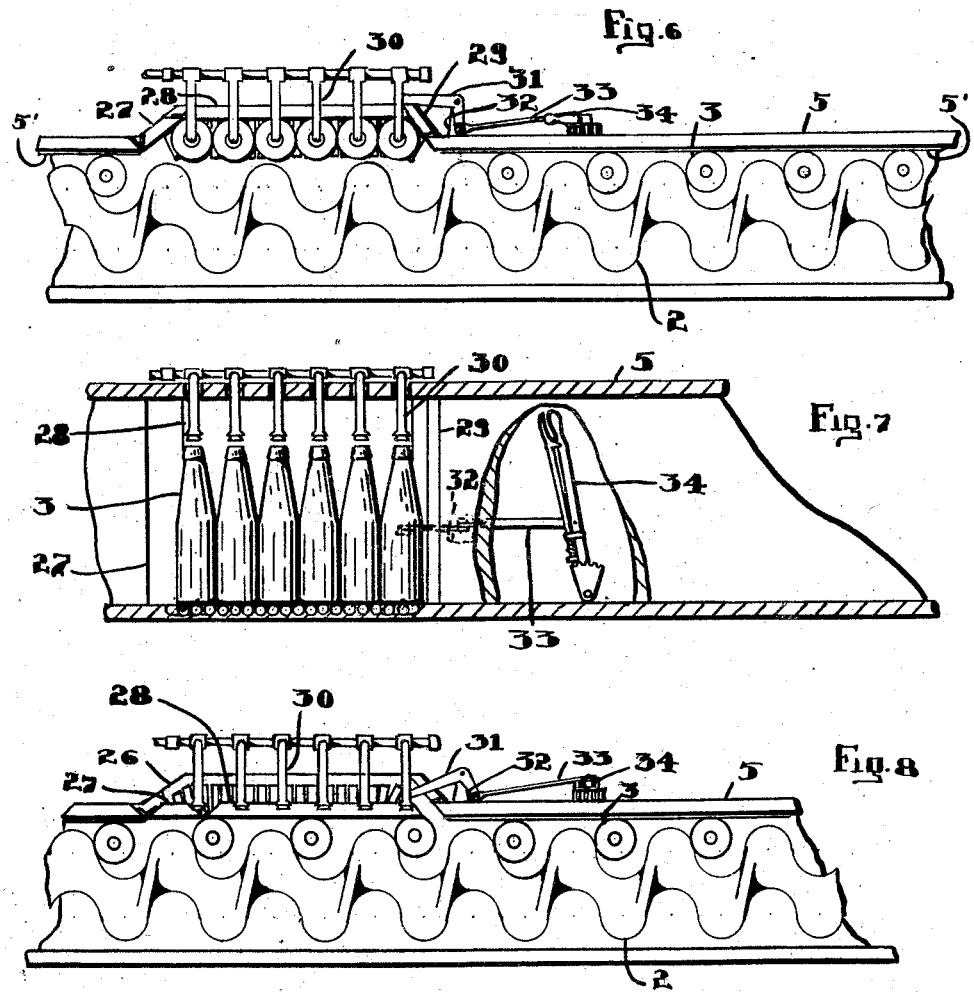

JOSEPH McDERMOTT, OF TOLEDO, OHIO.

CONVEYER AND LEER-CHARGING DEVICE.

No. 922,941.     Specification of Letters Patent.     Patented May 25, 1909.

Application filed June 17, 1908. Serial No. 438,897.

*To all whom it may concern:*

Be it known that I, JOSEPH MCDERMOTT, a citizen of the United States, residing at Toledo, Lucas county, Ohio, have invented a new and useful Conveyer and Leer-Charging Mechanism, of which the following is a specification.

This invention relates to a device for handling articles.

This invention has utility when adapted to transporting glassware, particularly in preparing glass articles for and charging them into leers.

Referring to the drawings: Figure 1 is an illustration of an embodiment of the invention for receiving bottles, as from a bottle-making machine, for fire finishing the stopper opening and transporting the bottles into a leer, parts being broken away; Fig. 2 is a fragmentary plan view in section, on a larger scale; Fig. 3 is a section on the line III—III, Fig. 2; Fig. 4 is a detail disclosing a portion of a mechanism whereby a second or follower transporting device section may be driven, or caused to have a determined rate of travel relative to the transporting device delivering thereto; Fig. 5 is a section on the line V—V, Fig. 4, looking in the direction of the arrow; Fig. 6 is a plan view of a portion of the transporting device having a fire finishing section in the form of a shunt or by-pass; Fig. 7 is an elevation of the fire finisher as shown by a longitudinal section through the transporting device with the spiral removed; and Fig. 8 is a view similar to Fig. 6 with the fire finishing by-pass eliminated.

Illustrative of a form of driving mechanism is here shown the belt 1 for actuating the rotatable article impelling or transporting device 2. This spiral or transporting device 2 is designed to receive articles, herein shown as bottles 3, delivered by chute 4, as from a bottle making machine. The spiral 2 is located in a box or housing 5, having slots 6 in the bottom thereof, and sectional cover 7. The slots 6 permit of some ventilation without allowing cold drafts to directly strike the warm glassware, while the slots also minimize the friction surface at the trough bottom and constitute an automatic cleaning means, for as articles travel along they force the foreign matter to move about and of course thus work into the slots. By removing the sectional cover 7, inspection may be conveniently made. Rib or bead 5' on the side wall of the way minimizes friction due to travel of the article, by offering less surface for contact. This transporting device and housing for the way are supported by uprights 8.

That end of spiral 2 remote from driving belt 1 is provided with gear 9 having teeth of such bevel that the spiral section 2 may be placed at the desired angularity to the succeeding follower section. Meshing with gear 9 is gear 10 of equal size, in order that the determined rate of travel of the follower section may be in this instance the same as that of the section 2. This gear 10 is mounted on large bearings 11, and has a segmental web or spiral sustaining portion 12. Carried by web segment 12 on the side adjacent section 2, is a spiral 13, which spiral continues on the opposite side of gear 10 as transporting device 14 extending through housing 15 and into leer 16, the remote end of which spiral 14 is sustained by bearing 17 without the leer, thus providing the charging device with no relatively moving parts exposed to the heat of the leer. The spiral 14 in extending across the leer 16 is located just above the endless platform or leer pans 18, which are movable to convey the articles annealed through the leer from the charging end to the discharging end. The temperature of the leer is controlled by means of flues 19 in the walls thereof supplying gas for fuel which is burned at the flue outlets in the leer.

When the impeller or spiral 14 causes a bottle to be forced against the stem 20 extending into the leer, this stem is forced outward against the resistance of spring 21, causing a contact to be made between lines 22 and 23, to thereby close a circuit and bring about the movement of the leer pans through signaling attendant by ringing bell 24. As shown in Fig. 5, there is an opening 25 between the housing for spiral section 13 and spiral section 14 to permit rotation of the web 12.

In handling some classes of glassware articles, for instance, fruit jars, there is not the necessity for fire finishing the stopper or closure end thereof, under which circumstances the leer charger in the form thus far described answers. However, other classes of articles, as bottles, are fire finished for stoppers, and to fulfil completely the requirements of a machine as a leer charger from a glassware making machine, provision is made for fire finishing in this disclosure.

Extending laterally from the housing 5 in the plane of the bottom 6 is platform extension 26, disclosed with rollers therein to minimize friction. Hinged to housing side 5 are sections 27 28, which when moved out of line of side 5 may form two sides of platform 26, the third side 29 being fixed. When this platform 26 is thus housed it forms a shunt or by-pass fire-finishing section provided with sets of burners 30. Pivoted to side section 28 is bell crank lever 31, which by working through a slot in side 29, may throw side 28 into line with side 5. For operation, the bell crank lever 31 is mounted on bracket 32, the lever being engaged by link 33 extending to hand lever 34 having segment and detent.

Operation: It is desirable that the relative speeds of the transporting devices be determined in order to avoid congesting. Herein the successive devices rotate at the same speed, gears 9, 10, being equal, and the source of power from belt 1 causes spiral 14 to be driven through spiral 2. Bottles 3, entering the chute 4, say as discharged from a bottle making machine, are delivered to one side of the spiral 2, which so rotates as to coact near the bottom with the bottle and urge it along the slotted way in the housing 5, which action while moving the bottle forward causes it to hug the outer wall of the way housing. Accordingly for those articles which it is desired to fire finish, with the by-pass opened out, the bottles 3 will at once be directed thereinto, and as succeeding bottles come along, the preceding ones are each urged forward one space, thus intermittently moving from burner to burner 30 of the fire finisher and then getting back into the transporting device for continuation of travel. The end walls 27, 29 of the by-pass are inclined, so that the articles entering and leaving may be readily urged along. The entering bottle as it starts away from spiral 2 and along wall 27, is engaged farther from the bottom by the spiral and the line of contact with the bottle is more directly working to push the bottle away than to urge it forward, so the bottle readily moves under a burner, which action has moved the bottle from the last burner out sufficiently far to be engaged by spiral 2 and conducted onward. When a batch is completed, to empty the fire finisher, hand lever 34 is gradually moved, so that the articles in the fire finisher are successively taken up by the spiral 2. In closing the fire-finisher, the burners 30 must be first swung upward as shown in Fig. 8, so that wall 28 may be placed in position. With the finisher so closed, articles not to be fire-finished may be regularly run through. The lateral urging of the articles helps in delivering them to the succeeding spiral 13, which coacts with the articles in a similar manner to continue the article travel. In Fig. 2 there is a ledge 5'' extending in line with way 5, so that the bottles 3 are kept within actuating range of spiral 2 until spiral 13 may engage, when through the combined action of the spirals and incline 15', the articles are directed into the housing 15 to be transported by spiral 14. The web 12 of gear 10 is designed to leave ample opening for travel of articles therethrough, and still be strong enough to support and drive spiral 13, 14. The narrow opening 25 in no wise interferes with the onward movement of the bottle toward the leer. The tendency of the articles to get away from the impellers, causes the first articles reaching the leer to be deposited on the pans adjacent the entry or charging opening, the succeeding articles only being kept in impelling relation with the spiral 14 by the articles already in the leer. Thus a grouping of the articles is gradually extended across the leer, and when an article is caused to actuate the plunger 20, the signal is automatically given by electric bell 24 for shifting the pans 18 forward, if this shifting is to be manually controlled, instead of having the device perform this operation directly. As the pans move forward, the spring 21 forces the stem 20 inward, when the articles are out of the way, the alarm ceasing, and the continuous operation of the transporting device is in no wise interfered with, the charging proceeding being repeated as above described. This mechanism is especially advantageous in permitting operation to be uninterrupted. For instance, the hot bottles from the bottle making machine, at once received in the inclosed way, have not opportunity to cool materially, may be fire-finished economically without any handling whatever by labor, as they are advanced at the desired rate of travel into the leer continuously. No intermittent stopping, wasting of heat by cooling of articles and leer is avoided, advantages in themselves, but all working together in the structure herein disclosed to make possible a maximum of output at a minimum of cost.

The arrows, Fig. 2, indicate the direction of rotation of spirals, that the travel of articles may be as described when the pitches as shown are used. The articles are individually impelled and delivered to the succeeding section for like handling. Furthermore, the articles are handled in an orderly manner, always in a determined position as to the spiral—on one side thereof.

It will be particularly noted that, in my improved construction, there are no relatively moving parts in contact with each other exposed to the heat of the leer, or to rapidly varying temperature conditions, as in the case of endless conveyers. The transporting device is mounted in bearings wholly external of the leer, and hence lubrication may be readily maintained. Moreover, all parts of the mechanism are subjected constantly to substantially the same temperature, and hence the rapid deterioration due to continual contraction and expansion and which occurs in prior constructions where parts of the conveyer move into and out of the furnace, is wholly eliminated.

What is claimed and it is desired to secure by Letters Patent is:

1. The combination with a leer, of a rotary device having an axial terminus exterior of the leer, said device embodying an impelling portion, and a way adjacent the impelling portion and along which the impelling portion is effective to cause the travel of objects into the leer.

2. A leer and a charging mechanism therefor comprising an axially and longitudinally fixed article transporting device disposed partly within and partly without said leer.

3. A leer and a rotatable spiral article transporting device extending thereinto for charging the leer, and journaled in bearings arranged outside of said leer.

4. The combination with a leer of a rotary impelling device having one axial terminus of its impelling portion within the leer, and the other terminus outside of the leer and a way adjacent the device along which way the impelling device is effective to cause the travel of objects in the leer.

5. The combination with a leer having pans, of a device for charging objects in the leer, said device being capable of rotation about an axis extending transversely of said leer and effective to slide the objects against each other and on the leer pans into a grouping parallel to the axis of rotation of the device.

6. In a glass ware conveying device, the combination with a way, and means for impelling articles along said way, of a recess or by pass formed in the side of said way into and through which the said articles are forced, and means for fire-finishing the articles as they travel through said by pass.

7. A glass ware transporting device comprising a trough or way, means for impelling articles along said way, and a fire finishing shunt or by pass communicating with said way and into which said articles may be forced when desired.

8. A glass ware transporting device, a trough or way, a fire-finishing shunt or by pass communicating with said way, means for impelling articles along and through said way and by pass, and means for rendering said by pass inoperative when desired, and confining said articles solely to said way.

9. A glassware transporting device having means for impelling the ware transported, and a fire finisher through which said ware is caused to travel by the pushing action of the device, each article of ware being caused to impinge against the next preceding one and thus force it along.

10. A glassware transporting device having means for impelling the ware transported, and a fire finisher through which said ware is caused to intermittently travel by the pushing action of the device, each article of ware being caused to impinge against the next preceding one and thus force it along.

11. The combination with a leer, of a charging device therefor, said device comprising a conveyer lying partly within and partly without the leer, the arrangement being such that the parts of said conveyer throughout the length thereof maintain the same relative position to said leer, at all times, whereby extreme temperature changes are avoided.

12. A leer charger embodying a primary section and an angularly disposed secondary section, said sections provided with scroll impelling portions to individually deliver articles handled from one to the other, there being a way coacting with the impelling portions.

13. A leer charging device embodying a pair of spiral conveyers having their axes disposed at an angle, the spirals being of the same pitch, and one of said conveyers extending into the leer, the arrangement being such that said conveyers act in synchronism, the articles discharged by one of said conveyers being carried forward, one at a time, by the other, and delivered into the leer at a uniform rate.

In testimony whereof I have hereunto set my hand in the presence of two witnesses.

JOSEPH McDERMOTT.

Witnesses:
GEO. E. KIRK,
C. H. RAUCH.